(12) United States Patent
Ostrowski et al.

(10) Patent No.: US 7,076,814 B2
(45) Date of Patent: Jul. 18, 2006

(54) HIGH FLOW RATE WATER SUPPLY ASSEMBLY

(75) Inventors: Michael H. Ostrowski, Lake Forest, IL (US); Jeffrey L. Mueller, Plymouth, WI (US); James R. Lewis, Kohler, WI (US); Stanley P. Kaymen, Sheboygan, WI (US); John H. Schott, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 148 days.

(21) Appl. No.: 10/720,718

(22) Filed: Nov. 24, 2003

(65) Prior Publication Data

US 2004/0154094 A1 Aug. 12, 2004

Related U.S. Application Data

(60) Provisional application No. 60/428,680, filed on Nov. 25, 2002.

(51) Int. Cl.
*A47K 3/00* (2006.01)
*A47K 3/10* (2006.01)

(52) U.S. Cl. .................................... 4/541.1

(58) Field of Classification Search ............ 4/490–493, 4/497, 507–509, 541.1, 541.3, 616, 668
See application file for complete search history.

(56) References Cited

U.S. PATENT DOCUMENTS

| | | | |
|---|---|---|---|
| 1,947,594 A | | 2/1934 | Heijkenskjöld |
| 4,330,412 A | * | 5/1982 | Frederick .................... 4/492 |
| 4,567,350 A | * | 1/1986 | Todd, Jr. .................... 392/486 |
| 4,700,884 A | | 10/1987 | Barrett et al. |
| 5,020,127 A | * | 5/1991 | Eddas et al. ................. 392/488 |
| 5,790,991 A | * | 8/1998 | Johnson ......................... 4/508 |
| 5,975,124 A | * | 11/1999 | Stevens, II ..................... 4/668 |
| 6,445,880 B1 | * | 9/2002 | Hollander et al. .......... 392/485 |
| 6,476,363 B1 | | 11/2002 | Authier et al. |

OTHER PUBLICATIONS

Charles M. Hohn, Sizing Plastic Pipelines for Water on the Range Guide B-810, 1998, New Mexico State University, 2 pages.*
SEISCO; Seisco Product Description & Specifications; undated.
Bio-Radiant Energy, Inc.; Comfort Hydro-Rad Heating with Domestic Hot Water; Dated Mar. 27, 2002; Woodinville, WA.
Marshall Brain; How Water Towers Work; http://people.howstuffworks.com; printed Nov. 21, 2003; © 1998-2003 HowStuffWorlks, Inc.
Marshall Brain; How Water Heaters Work; http://home.howstuffworks.com; printed Nov. 21, 2003; © 1998-2003 HowStuffWorlks, Inc.

* cited by examiner

*Primary Examiner*—Tuan Nguyen
(74) *Attorney, Agent, or Firm*—Quarles & Brady LLP

(57) ABSTRACT

An assembly for rapidly filing bathtubs, whirlpools, spas, washing machine drums and the like includes a basin, water storage tank(s) (such as hot and cold water storage tanks), and a system for controlling the filling of the basin from the tank(s). When it is desired to supply water to the basin, this is expedited by placing the tank(s) above the basin, using connecting piping with extra large area, using a pressure pump, and/or providing extra large delivery ports. The tank(s) are dedicated to the assembly, and preferably are closely adjacent thereto. Controls are provided to avoid excess weight gathering adjacent the basin.

20 Claims, 5 Drawing Sheets

HIGH FLOW RATE WATER SUPPLY ASSEMBLY

CROSS-REFERENCE TO RELATED APPLICATION

This application is a CIP claiming priority based on U.S. provisional application 60/428,680, filed Nov. 25, 2002.

STATEMENT OF FEDERALLY SPONSORED RESEARCH OR DEVELOPMENT

Not applicable.

BACKGROUND OF THE INVENTION

The present invention relates to bathtubs, whirlpools, spas, clothes washing machines, and other plumbing devices where a large basin must be supplied with a large volume of water. More particularly, it relates to assemblies for achieving rapid "filling" of such basins.

When it is necessary to fill a large basin with water from a conventional plumbing supply, the filling time can be significant. For conventional bathtubs and whirlpools, the volume of water required for filling is so large that it can take ten minutes or more for a conventional bathtub or whirlpool to fill to a level that satisfies the user. This problem is exasperated in hospitals, and other places of temporary residence like hotels, in which several people need to take baths consecutively or simultaneously, with the assistance of limited staff.

Often people choose to take a shower instead of a bath largely because of the fill time required. For example, in the morning a person may not have the extra time before work to wait for the bath to fill. Even when one has time to wait for the tub to fill, it can be frustrating having to wait. This may lead people to begin their bath before the water has risen to the preferred level, which may cause discomfort until the fill is completed if the surrounding room is cool, as is common in the winter.

While the volume of water needed to fill a drum in a washing machine is considerably less than the volume needed to fill a conventional bathtub, during a typical wash cycle the drum must be filled and drained at least twice. As a result, the filling time of about two minutes per fill can significantly increase the overall time needed for a wash cycle. This is a particularly acute problem for Laundromats or other commercial washing facilities as this may increase the number of washing machines that they need to meet consumer requirements for capacity at given peak use times.

Moreover, even where washing machines are available for use, consumers want the wash cycle to be completed quickly, for example, to limit the amount of time spent waiting between load cycles at the Laundromat.

In any event, bathtub and whirlpool systems typically share a water heater that is also used to supply other plumbing fittings in the building (e.g., a shower). When one uses large quantities of heated water to fill a bathtub or the like, all the available fully heated water in the residence can be temporarily used up, which may be particularly of concern to those who want to take a shower using the same supply. This can create scheduling problems.

Yet another concern is that when such basins are being filled, water pressure in the rest of the building can be adversely affected. Further, when a very large basin, such as a whirlpool, is being filled, this can use up the fully heated water supply for about a half an hour.

There have been attempts to provide multiple water heaters for buildings that have high water use requirements, particularly when there is a large bathtub or whirlpool. While this helps reduce the hot water availability concern, it does little to address concerns about the filling speed of the tub, and may or may not address water pressure concerns depending upon what else is linked to the same hot water heater.

Also, many rural communities pump well water to an elevated water storage facility (e.g., a water tower) so as to provide a standby water supply (and reduce pressure fluctuations). However, that supply is to supply the entire water needs of a geographic area, and does not involve heated water. Further, a variety of industrial batch processing systems incorporate one or more pumps to facilitate flow.

In any event, a need exists for improved systems for rapidly filling large plumbing and washing machine basins with water, while reducing adverse effects on the other plumbing systems in the building.

SUMMARY OF THE INVENTION

The invention provides an assembly for very rapidly delivering water to a basin, such as a drum in a washing machine or the large basin of a bathtub, whirlpool, spa or other plumbing fixture.

In one aspect of the invention, the assembly has a basin, a hot water storage tank, a cold water storage tank, and a system for controlling the flow of water from the tanks to the basin. Means are provided for expediting the flow of water from at least one of the tanks to the basin. These means are selected from the group consisting of (a) structures retaining at least one of the tanks at a position above at least a portion of the basin (such that gravity can facilitate water flow from that tank to the basin when water is present in that tank); (b) conduit connecting the tank(s) to the basin which has a passageway cross-sectional area of at least five square inches (so that more water can flow past a point for any given pressure); (c) one or more pressure pumps (to increase the flow volume); and (d) delivery ports adjacent the basin for delivering water to the basin from the tanks, the ports having an outlet area totaling at least five square inches.

At least one of the tanks is dedicated to the assembly (preferably both). The term "tank" is used herein to mean a vessel or enlarged tube (more than three square inches in cross-sectional area) for containing liquid, including but not limited to open or closed storage vessels, of rigid or compliant construction. By "dedicated" we mean that it is not used for a supply purpose other than filling a basin of the assembly. In this form, the needed water supply is ready on a stand-by basis, without the need to cut off water or reduce water pressure to other applications. By "hot" and "cold" we mean temperatures relative to each other. Most typically a cold water supply is at environmental temperature or below, and a hot water supply is heated above the environmental temperature.

In a preferred form at least one of the tanks is positioned within twenty (more preferably ten) feet of the basin. This reduces temperature stratification within conduits between the tanks and basin, which can cause the incoming water initially to be colder than desired. Further, it minimizes the amount of special diameter piping that needs to be used when piping diameter is enlarged to achieve the quick "fill".

In another preferred form, the delivery means is a centrifugal pressure pump that facilitates a large volume flow rate. Even more preferably, the pump is variable speed, so that splashing can be minimized by providing an initial flow volume delivered at a lower flow rate, for example 10 gallons/minute, and then quickly ramping up to a high flow rate many times the initial rate to rapidly fill the basin.

In yet another form, there are controls (preferably electronic controls) for monitoring the temperature of water in the basin, for monitoring the height of water in the basin, for initiating refilling of the tanks, for sensing flow from the basin drain, for sensing the presence of non-water objects in the basin, and/or for controlling heating of water in the hot water tank. Among these controls can be those that inhibit resupply of water to at least one of such tanks when the amount (e.g., weight/level/or volume) of water in the basin is in excess of a specified amount. This avoids too much weight being collected at one area of the building, which may be regulated by local ordinances and/or may jeopardize the structural integrity of the room, and/or require special structural bracing.

The assemblies of the present invention can deliver water from the tanks to such basins at a rate exceeding 75 (preferably exceeding 500, even more preferably exceeding 750) gallons/minute. If the tanks are enclosed, vents are preferably provided to relieve any flow reducing vacuum that may otherwise occur during a basin fill cycle and to alleviate pressure build-up when the tanks are re-filled.

With such systems even large whirlpool tubs can be completely "filled" in under a minute, and most surprisingly even in under fifteen seconds in some embodiments.

Other alternative attributes in some embodiments are that the assembly can deliver water exclusively, or in combination with dedicated fill openings, through existing openings in the basin, such as drain openings, jet orifices and circulation ports. The basin can alternatively be filled in a waterfall manner using a wide-mouthed spout or a circumferential filler extending near the top along multiple sides of the basin. The waterfall could also be sustained in a continuous, recirculating manner after the initial fill. Also, the hot and cold water from the tanks can be partially or totally mixed prior to entering the basin.

In another aspect the invention provides an assembly for rapidly delivering water to a washing machine drum, a bathtub, a whirlpool, a spa or other plumbing fixture. A delivery system delivers water from a dedicated water storage tank to the basin at a rate of at least about 75 gallons/minute. This assembly can include one, two or more tanks, of rigid construction or in the form of bladders or conduit.

Thus, for example, the invention encompasses using a single vessel-type tank or large diameter conduit as well as an assembly of one tank containing very hot water and a large diameter water pipe bringing in fresh unheated water, provided water is delivered to the basin at a rate approximately at or exceeding 75 gallon/minute. If a single tank is used, the system could include a heater to allow temperature control of the water entering the basin. With multiple tanks, a heater could be provided to heat water in one tank, which is then mixed with the cooler water in the other tank before or after entering the basin.

The invention also provides an assembly for delivering water at a rate of at least 75 gallons/minute to a basin through a water conduit defining a passageway cross-sectional area of at least 5 square inches. More preferably, the conduit extends between the basin and a utility water line to the exterior of a building housing the basin. The conduit could be dedicated to the assembly and thus feed the basin with water directly from the water main. Or, it could feed the assembly and other water fixtures in the building. In this case, the conduit could branch to other conduit, likely of decreased area, before reaching the other fixtures, with the large area conduit continuing to the basin. The assembly could also include an in-line heater for heating a length of the conduit.

Accordingly, the invention, in various embodiments, provides assemblies that can much more quickly "fill" large basins in whirlpools, spas, other bathtubs, washing machines, and the like. Further, it can do so without disrupting the water supply of the building in which the system is mounted.

These and still other advantages of the invention will be apparent from the detailed description and drawings. What follows is merely a description of preferred embodiments of the present invention. To assess the full scope of the invention the claims should be looked to as the preferred embodiments are not intended to be the only embodiments within the scope of the claims.

DETAILED DESCRIPTION OF THE PREFERRED EMBODIMENTS

Figure 1:
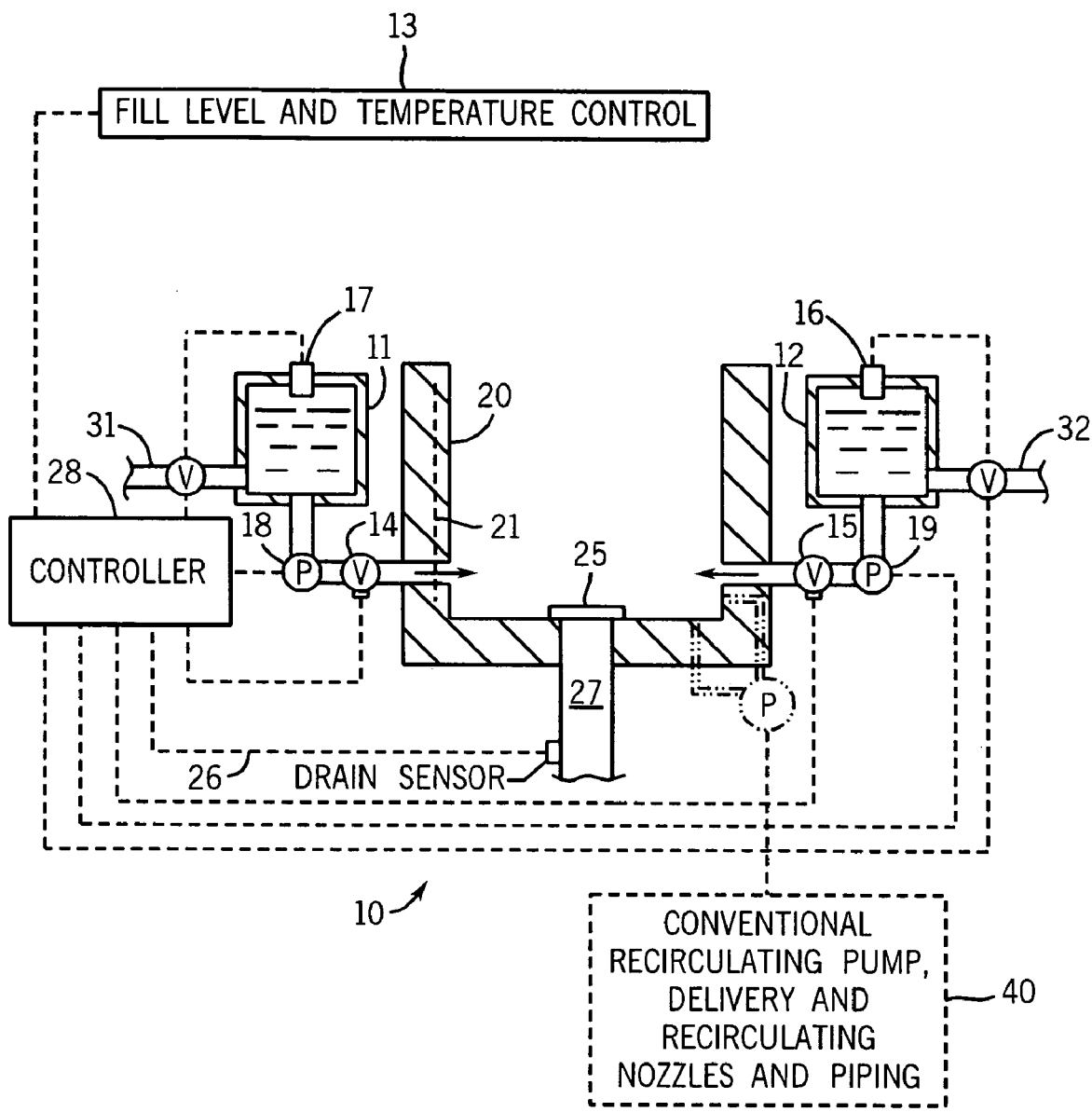
FIG. 1 is a schematic view of a preferred assembly of the present invention, incorporated into a whirlpool.

FIG. 1 depicts a whirlpool tub assembly 10 of the present invention. A cold water storage tank 11 and hot water storage tank 12 are maintained in the full condition between uses. As this system fills the hot water tank from the building hot water heater (not shown), the hot water tank is insulated.

The water storage tanks can be conventional rigid, such as metal or plastic, vessels. They may also be compliant bladders, or take the form of large cross-sectional area conduit. For the conduit to be considered a tank herein, at least a portion of the conduit must have a passageway of more than 3 square inches (preferably at least about five square inches) in cross-section, which can be circular or otherwise.

Prior to the fill cycle a sensor (not shown) is read to detect the presence of a person, pet or other non-water object inside the basin. Any suitable sensor for detecting proximity, capacitance, weight or other presence indicating parameter can be used. One possibility is an infrared proximity sensor. The sensor can be coupled to electronic controls 13 by a feedback circuit to prevent commencement of the fill cycle, or at least prevent the high volume flow of a rapid fill cycle.

At the start of the fill cycle, a fill level and temperature are selected using the electronic controls 13. Fill control valves 14 and 15 are caused to open, vent and level control valves 16 and 17 are caused to open, pumps 18 and 19 are caused to start, and water is transferred from the tanks into the whirlpool basin 20. The vent control valves 16 and 17 open the tanks to atmosphere so as to relieve any flow reducing vacuum that may develop as the tanks are emptied. These valves are also open when the tanks are refilled to alleviate positive pressure.

Water from the tanks can fill the basin through designated fill openings located at any part of, or in any relation to, the basin, for example, at the bottom or sides. Other exemplary designated water inlet locations are provided in the drawings and are discussed below. With suitable conduit and routing arrangements, and valving, the water may also fill the basin through existing openings conventionally used for other purposes. For example, water may fill through the drain opening of a bathtub or the jet orifices or circulation ports of a spa or whirlpool tub. If the basin is the drum of a washing machine, in addition to designated side, top, or bottom fill openings, the fill water could be routed to pass into the drum through the numerous small drain openings in the drum, which are conventionally designed to drain water during the spin cycle.

Whether specially designated fill openings or pre-existing openings, the overall combined opening area is preferably at least about 5 in$^2$, more preferably about 10 in$^2$ and still more preferably about 100 in$^2$. Use of the existing openings for filling adds to the total inlet area and thus further facilitates rapid filling of the basin.

Control valves 14 and 15 determine the volume (and thereby the relative mix) of hot and cold water to be delivered, thereby achieving a desired predetermined temperature set at the start of the filling cycle. Further, there can be a temperature sensor in the hot water storage tank or along an internal wall of the basin 20, providing feedback to these valves in the event that temperature falls outside of a desired range, for adjustment of the volume ratios.

Pumps 18 and 19 may be driven by separate motors, or by a single motor driving both pumps simultaneously. The pumps are preferably variable speed, centrifugal or impeller type pumps providing a high flow rate. The pumps 18 and 19 operate a low pressures, preferably 5–15 psig (more preferably 6–7 psig dynamic), and low horsepower, preferably 0.25–5 HP (more preferably 1–2 HP). Variable speed allows for the initial fill cycle to begin at a low flow rate, such as 10 gallons/minute, until a prescribed level (e.g., the first inch or two) of the basin is filled and then the pumps could ramp up quickly to provide a much higher flow rate, for example up to 800 gallons/minute to achieve a rapid fill.

The fill level sensor 21 detects and confirms the fill level desired (once reached), shuts off pumps 18 and 19, and closes control valves 14 and 15 accordingly. The fill level can be any desired height. However, if it is within 1¼" of the basin rim, a vacuum breaker (not shown) or air space should be provided between the basin and the building water supply to prevent back flow of water from the basin as required by many local codes.

Depending upon the location of the hot and cold water storage tanks, water transfer from the hot and cold water storage tanks may be motivated by gravity only, and/or by gravity with added pressure from pumps 18 and 19, and/or due only to pressure from pumps 18 and 19. For example, with the water storage tanks above the whirlpool or bathtub, as mounted in an attic above a bathroom for example, extremely fast water transfer due to gravity will be possible.

With the storage tanks at approximately the same height as the whirlpool tub (with part of the tank above part of the basin), initial water transfer may be partially due to gravity. However, for adequate speed of filling use of low pressure pumps may be desirable to supplement this.

If the tanks are mounted still lower, the effects of gravity must be overcome, and in addition the water must be separately expedited. Hence, in this last situation higher pressure pumps may be more suitable.

As noted above, an important advantage of the present invention is to permit very high flow rate "filling", preferably without adversely affecting the rest of the building plumbing system. With conventional plumbing practices, flow rates at about 25 gallons per minute are common. Thus, for a whirlpool that takes 150 gallons to fill, it can take over five minutes for the water in the tub to fill. The present invention can reduce this to the range of ten or fifteen seconds.

There can also be appropriate sensors for the weight of water, volume of the water, or water level, in the basin, which can provide a feedback mechanism to the valve that resupplies the storage tanks. When the water amount is high in the basin, valves associated with tank resupply will close. Only after little or no water remains in the basin will the resupply be permitted. This helps avoid the need to specially structurally reinforce the construction around the tub in those assemblies where the storage tanks are immediately adjacent the basin.

At the end of the use of the whirlpool, a drain 25 can be opened manually, or using an electronic system 26. With this latter embodiment an electronic drain sensor 27 could detect the completion of the draining, and could send such a signal to the controller 28. The controller 28 could then send signals to cold water supply control valve 31 and hot water supply control valve 32, as well as vent and level control valves 16 and 17, to allow the cold water storage tank 11 and the insulated hot water storage tank 12 to refill from conventional water supply sources.

Figure 6:
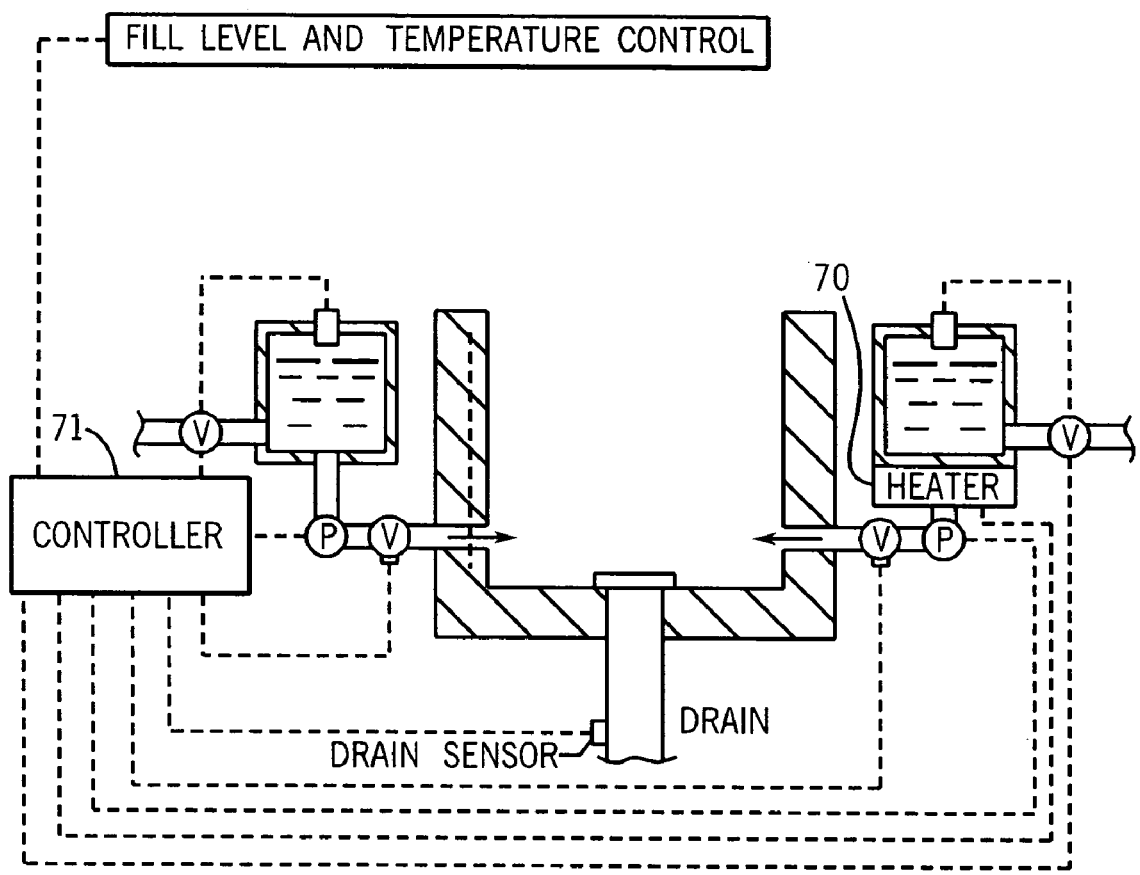
FIG. 6 is a view similar to FIG. 1, but of an alternative embodiment having additional features such as a water heater system.

The hot water storage tank 12 could have its own heater (see FIG. 6). Alternatively, as shown in FIG. 1, it could be supplied from a conventional hot water heater. When the cold water storage tank is refilled, as sensed by the level control valve 17, cold water supply valve 31 shuts off. In similar manner, when the hot water tank 12 is refilled, as sensed by the level control valve 16, the hot water supply valve 32 shuts off. The system is then ready for another fill and usage cycle.

For situations where total water weight is not a significant limitation, the water storage tanks could be refilled immediately after the "filling" of the basin 20 is complete, or refilling could commence during the whirlpool filling period, albeit at a much slower rate than used to fill the tub (e.g., 10–20 gallons per minute).

The "filling" speed from the tanks to the basin can be increased with suitably large diameter connecting piping (e.g., in the range of 3–8" diameter, for example), or by increasing the effective opening cross-sectional area of the filling outlet(s) to five square inches or more. The disclosed assembly is intended to fill a 150 gallon capacity whirlpool at about 800 gallons per minute so that the tub is filled in about 10 seconds. In the case of a clothes washer, this type of system could provide a clothes washer that can have its drum filled in less than five seconds.

Numeral 40 in FIG. 1, and the associated dotted lines, are meant to represent that there is also the usual circulating pump, on/off controls, delivery nozzles and water recirculation nozzles. Of course, these would not be present in the case of a non-whirlpool bathtub.

A common motor may be used to drive pumps 18 and 19, as well as the whirlpool circulation pump. During the fill cycle, pumps 18 and 19 would operate to fill the basin 20, and then run the whirlpool pump as needed.

Figure 2:
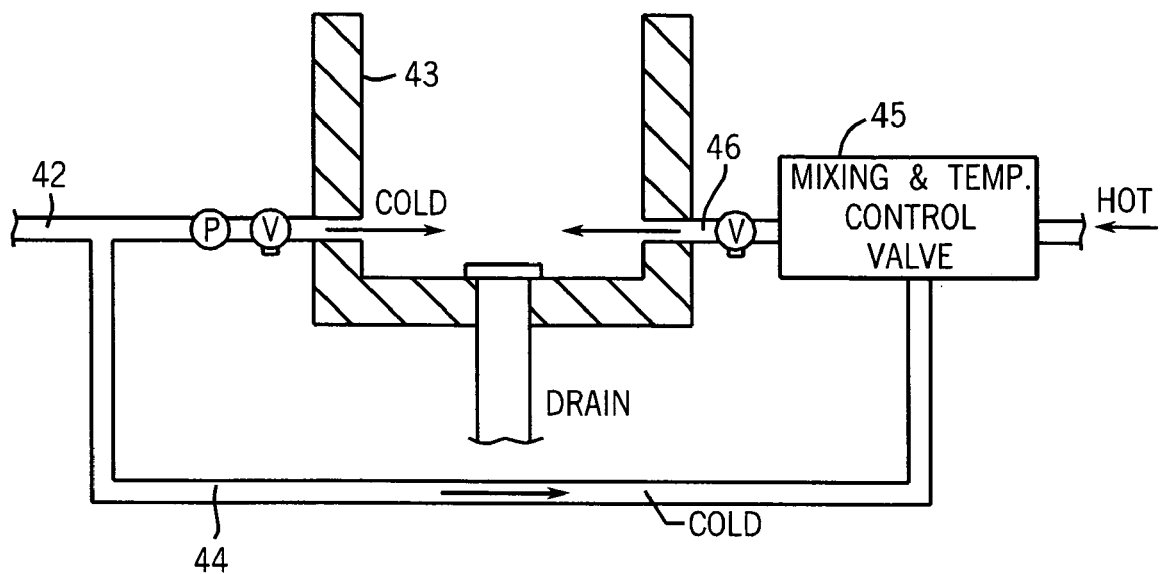
FIG. 2 shows, in schematic form, an alternative embodiment, with focus on the basin area and how cold and hot water can be separately supplied to the basin, and/or alternatively mixed to a partial extent.

FIG. 2 shows that the conduit, preferably being pipe of circular or other cross-section, from the cold supply 42 could run directly to the basin 43 without pre-mixing. There could also be a branch 44 that feeds into a mixing and temperature control valve 45 to provide temperature modulated hot water through inlet 46. This helps avoid hot water scalding.

Figure 3:
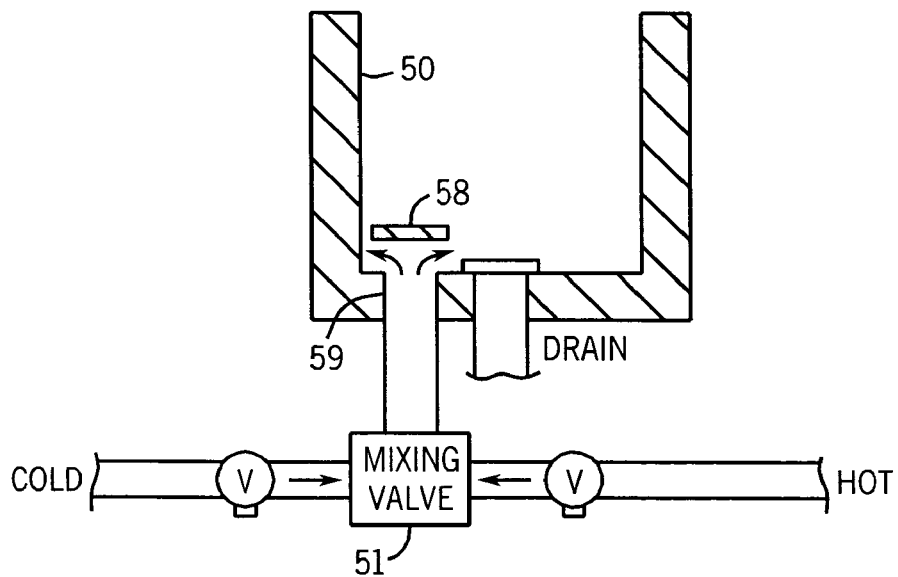
FIG. 3 is a view similar to FIG. 2, but showing in schematic form another alternative embodiment where pre-mixed water enters from the bottom of the basin.

FIG. 3 shows another embodiment, albeit where water is delivered up from the bottom of the basin 50 and where the water is mixed prior to reaching the basin 50 at a mixing valve 51. This has the advantage of greater control over the temperature of the water entering the tub.

With this FIG. 3 system, a suitable flow diverter plate 58 may be fitted above bottom filling port 59 to direct water flow radially and thereby eliminate any possibility of volcano-like water streams shooting up from the bottom of the basin 50 during the initial seconds of the filling cycle.

Figure 4:
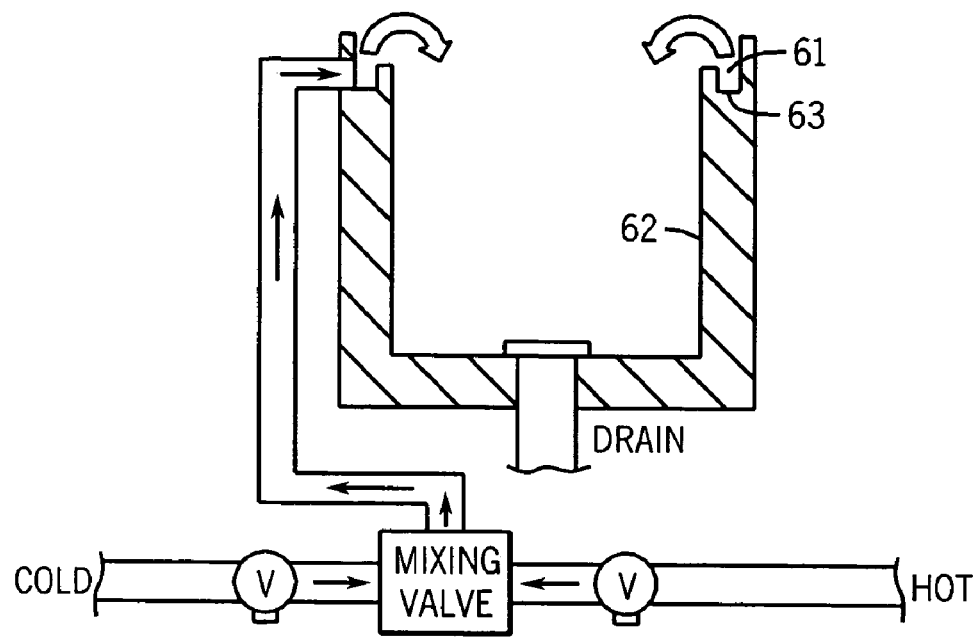
FIG. 4 is another view similar to FIG. 2, but showing another alternative embodiment where delivery ports are near the upper portion of the basin.

FIG. 4 shows another embodiment with a mixture of hot and cold water delivered to one or more delivery ports along the upper rim 61 of the basin 62. This can be achieved by an elongated or wide-mouth spout or through a trough arrangement 63, so that water will spill over into the basin 62 in a high flow waterfall manner. Alternatively, there could be a slotted opening along the entire upper rim analogous to a toilet rim structure. Thus, the waterfall type delivery can be from a wide-mouth spout at one side of the basin, or in a surrounding arrangement in which water falls over multiple sides of the basin. Moreover, recirculation lines and ports can be employed so that a continuous single or multi-sided waterfall effect can be achieved.

Figure 5:
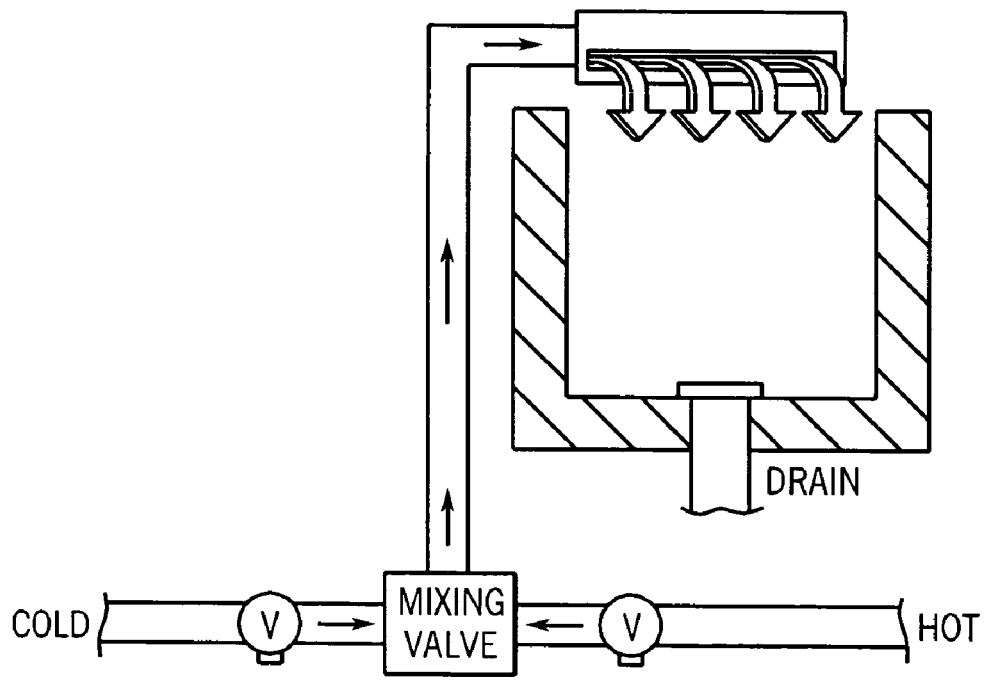
FIG. 5 is yet another view similar to FIG. 2, but showing yet another embodiment, albeit where the water is supplied in mixed form by an external manifold mounted above the basin.

FIG. 5 shows another embodiment, where there is a mixture of hot and cold water is delivered to a manifold with a large opening above the basin. For example, a rectangular external fitting with in a single 20" by 6" opening could deliver over 800 gallons per minute. The arrangement shown in FIG. 5 could provide for overhead delivery, and in a preferred form provide for a forest of water columns.

FIG. 6 shows another embodiment like that of FIG. 1. However, with this embodiment there is a heater system 70 so that the hot water storage tank functions as a hot water heater as well. The heater controls can be linked to the overall controller 71. This alternative would permit the hot water storage tank to be resupplied from the cold water supply of the building, thereby further minimizing adverse impacts on the rest of the building.

Such a system would preferably maintain the hot water in the tank in the 150–190° range in the case of a whirlpool, bathtub or spa, and perhaps even higher in the case of a laundry washing machine application. The higher the temperature of the water in the storage tank, the more beneficial the effect of destroying certain water borne bacteria, spores or viruses that sometimes affect certain plumbing systems.

Further modifications may be made to the FIG. 6 system, such as would provide control or adjustment of the recovery rate or recovery time desired, or the time-of-day desired to heat or refill the system. In a commercial system this could take advantage of reduced off-peak utility rates for electricity that are available at only limited times of the day.

Figure 7:
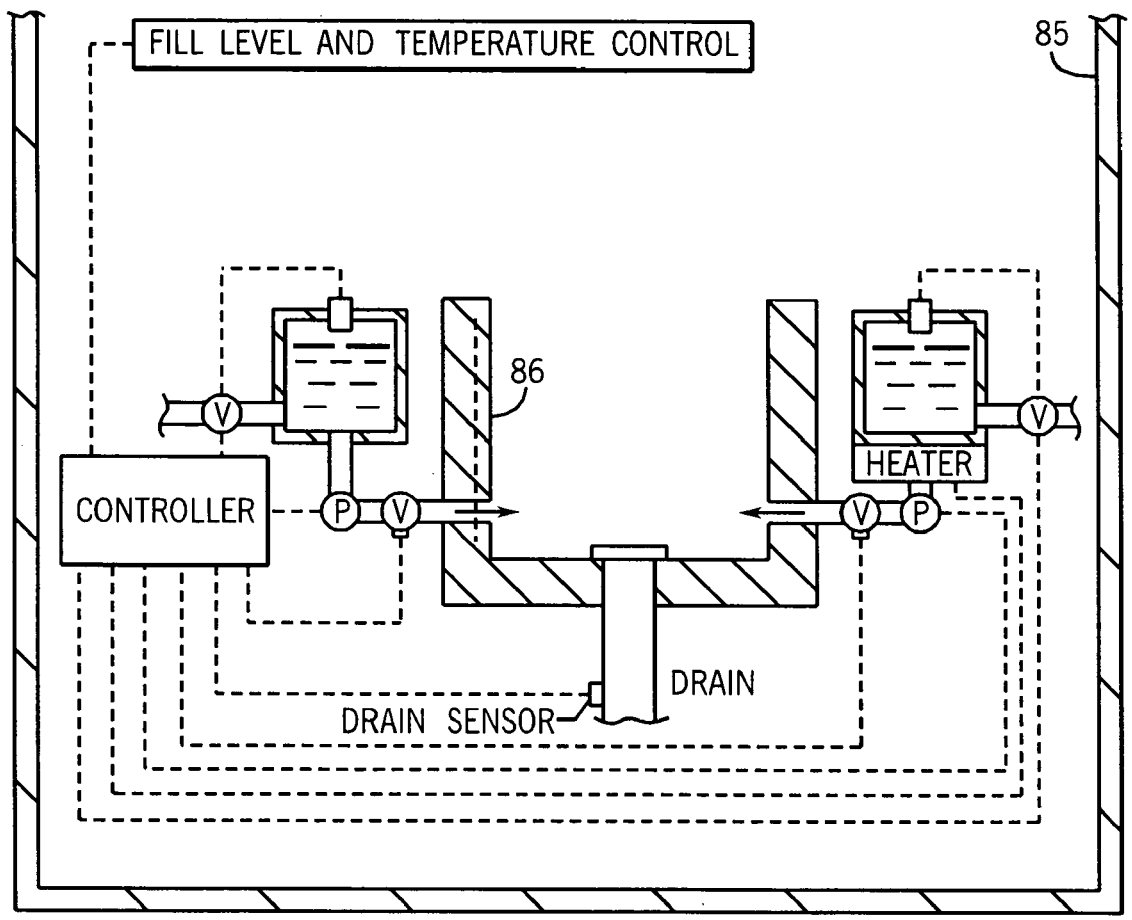
FIG. 7 is a view similar to FIG. 1, but of an embodiment incorporated in a laundry washing machine.

FIG. 7 shows in schematic form how the invention could be applied to a laundry washing machine 85. While the volume of the drum 86 in such a device is much smaller than the volume of the basins depicted for the plumbing fixtures, the drum 86 will need to be filled two or more times during a typical wash cycle. Hence, quick refill capability does save significant time during an overall wash cycle. In this regard, a typical fill time of two minutes per fill can be reduced to five seconds per fill.

The savings of five minutes or so per wash can be quite valuable in many settings. For example, in a Laundromat or other commercial washing establishment, this could mean that fewer washing machines will be needed. For consumers, this will mean less wasted time waiting for each laundry load to finish.

Of course, a variety of other changes can also be used. For example, a single dedicated hot water tank could supply several washing machines. In such a case, the tank would still be deemed "dedicated" to the assembly provided that the tank does not also supply sinks, showers or the like.

Further, the controls for such a system could provide different mixes of hot and cold for different portions of the washing machine cleaning cycle. For example, both the hot and cold tanks could assist in filling the basin during the initial wash stage. During a following sterilization stage just hot water could fill the basin. Then, just cold, just hot, or a mix could be used for the rinse stage.

Although not shown in the drawings, for both plumbing and laundry washing applications, the present invention could also be practiced using a single water storage "tank", provided the water is delivered to the basin at or above about 75 gallons/minute. Thus, a single conventional storage tank could be used in which the water filling the basin can be maintained at a desired (and variable) temperature, using a suitable a heater/sensor system, without the need to mix hot and cold water streams either before or after entering the basin. The assembly may alternatively include a single dedicated water line, which is temperature controlled by a heater. A 3" diameter pipe is expected to provide sufficient flow rate at suitable pressures for both plumbing and washing machine applications.

The invention also encompasses an assembly for delivering water at a high rate, preferably at least 75 gallons/minute, to a basin through a water conduit having a large passageway cross-sectional area, preferably at least 5 square inches. As mentioned, a 3" diameter line could be used for example. The conduit could be a dedicated line, in which case it would extend essentially from the building water meter to the basin or between the basin and a utility water line at the exterior of a building housing the basin. Or, the conduit could feed the assembly and other water fixtures in the building in which the conduit would branch to other (likely smaller cross-sectional area) conduit before reaching the other fixtures. The large area conduit would continue on to feed the basin. Preferably, the assembly would include a, preferably in-line, heater for heating a length of the conduit to the desired temperature for supplying water to the basin so that no mixing is necessary.

It should be appreciated that preferred embodiments of the invention have been described above. However, many modifications and variations to the preferred embodiments will be apparent to those skilled in the art, which will be within the spirit and scope of the invention. Therefore, the invention should not be limited to the described embodiments. To ascertain the full scope of the invention, the following claims should be referenced.

INDUSTRIAL APPLICABILITY

The invention provides improved devices for quickly filling basins found in bathtubs, whirlpools and other plumbing fixtures and washing machines.

We claim:

1. An assembly for rapidly delivering water from a water supply to a basin, the assembly comprising:
    a basin;
    a first storage tank receiving water from the water supply and storing a first volume of water, wherein the first storage tank is connected such that when the first volume of water is supplied to the basin the water supply fills the basin at a higher rate than without the first storage tank;
    a second storage tank receiving water from the water supply and storing a second volume of water, wherein the second storage tank is connected such that when the second volume of water is supplied to the basin the water supply fills the basin at a higher rate than without the second storage tank;
    a system for controlling the flow of water from the storage tanks to the basin when it is desired to supply the basin from one or more of the storage tanks; and means for expediting the flow of water from at least one of the storage tanks to the basin when it is desired to supply water there from to the basin, the means being selected from the group consisting of:
    (a) structures retaining at least one of said storage tanks at a position above at least a portion of the basin such that gravity can facilitate water flow from that tank to the basin when water is present in that tank;
    (b) conduit connecting the at least one of said storage tanks to the basin which has a portion with a cross-sectional area of at least five square inches;
    (c) a pressure pump; and
    (d) delivery ports adjacent the basin for delivering water to the basin from said at least one of said storage tanks, the ports having an outlet cross-sectional area totaling at least five square inches;
    wherein at least one of the storage tanks is dedicated to the assembly to supply water to the basin only.

2. The assembly of claim 1, wherein both of the storage tanks are dedicated to the assembly to supply water to the basin only.

3. The assembly of claim 1, wherein at least one of the storage tanks is positioned within twenty feet of the basin.

4. The assembly of claim 3, wherein at least one of the storage tanks is positioned within ten feet of the basin.

5. The assembly of claim 4, wherein both of the storage tanks are positioned within ten feet of the basin.

6. The assembly of claim 1, wherein the assembly further comprises controls for performing at least one of monitoring temperature of water in the basin, monitoring height of water in the basin, initiating refilling of the storage tanks, sensing flow from the basin drain, sensing the presence of non-water objects within the basin, and controlling heating of water in the first water storage tank.

7. The assembly of claim 1, wherein the basin is a drum in a washing machine.

8. The assembly of claim 1, further comprising means for inhibiting resupply of water to at least one of the storage tanks when the amount of water in the basin is in excess of a specified amount.

9. The assembly of claim 1, wherein the assembly can deliver water from the storage tanks to the basin at a rate exceeding 75 gallons/minute.

10. The assembly of claim 9, wherein the assembly can deliver water from the storage tanks to the basin at a rate exceeding 500 gallons/minute.

11. The assembly of claim 10, wherein the assembly can deliver water from the storage tanks to the basin at a rate exceeding 750 gallons/minute.

12. The assembly of claim 1, wherein the assembly can deliver water to the basin in a waterfall manner.

13. The assembly of claim 12, wherein the waterfall is provided at multiple sides of the basin.

14. The assembly of claim 1, wherein the hot and cold water from the storage tanks can be mixed prior to entering the basin.

15. The assembly of claim 1, wherein the means for expediting is the pressure pump.

16. The assembly of claim 15, wherein the pump is a variable speed pump.

17. The assembly of claim 15, wherein the pump is a centrifugal pump.

18. The assembly of claim 15, wherein the pump is capable of supplying up to 800 gallons/minute of water.

19. The assembly of claim 1, wherein at least one of the delivery ports is selected from the group consisting of jet orifices, drain openings and openings of circulation lines.

20. The assembly of claim 1, wherein the hot and cold water storage tanks are vented during a basin fill cycle.

* * * * *